(12) United States Patent
Khatuntsev

(10) Patent No.: US 11,592,293 B2
(45) Date of Patent: Feb. 28, 2023

(54) LASER MEASURING SYSTEM WITH MULTIPLE SYNCHRONOUS BASES

(71) Applicant: Topcon Positioning Systems, Inc., Livermore, CA (US)

(72) Inventor: Nikolay V. Khatuntsev, Pleasanton, CA (US)

(73) Assignee: Topcon Positioning Systems, Inc., Livermore, CA (US)

( * ) Notice: Subject to any disclaimer, the term of this patent is extended or adjusted under 35 U.S.C. 154(b) by 539 days.

(21) Appl. No.: 16/710,090

(22) Filed: Dec. 11, 2019

(65) Prior Publication Data
US 2021/0180949 A1 Jun. 17, 2021

(51) Int. Cl.
*G01C 3/08* (2006.01)
*G01B 11/00* (2006.01)
(Continued)

(52) U.S. Cl.
CPC ........... *G01C 3/08* (2013.01); *G01B 7/004* (2013.01); *G01B 7/14* (2013.01); *G01B 11/002* (2013.01);
(Continued)

(58) Field of Classification Search
CPC ........ G01C 15/06; G01C 15/00; G01C 11/02; G01C 13/008; G01C 11/06; G01C 1/02; G01C 21/20; G01C 11/30; G01C 21/005; G01C 15/105; G01C 15/006; G01C 25/00; G01C 3/08; G01C 15/008; G01C 23/005; G01C 3/00; G01C 5/00; G01C 1/00; G01C 11/025; G01C 3/02; G01C 21/3602;
(Continued)

(56) References Cited

U.S. PATENT DOCUMENTS

| 4,368,982 | A | | 1/1983 | Van Arnam et al. |
| 4,820,041 | A | * | 4/1989 | Davidson ............... E02F 3/842 |
| | | | | 33/294 |

(Continued)

FOREIGN PATENT DOCUMENTS

| CN | 106950541 A | 7/2017 |
| CN | 108872937 A | 11/2018 |

OTHER PUBLICATIONS

International Search Report and Written Opinion dated Mar. 18, 2021, in connection with International Patent Application No. PCT/US2020/050788, 23 pgs.
(Continued)

*Primary Examiner* — Michael P Stafira
(74) *Attorney, Agent, or Firm* — Chiesa, Shahinian & Giantomasi PC

(57) ABSTRACT

A laser measuring system including first and second laser base stations and a laser receiver is provided. The laser receiver detects a first laser signal from the first laser base station. Location information associated with the first laser base station is extracted from the detected first laser signal. The laser receiver detects a second laser signal from the second laser base station. Location information associated with the second laser base station is extracted from the detected second laser signal. A position of the laser receiver is determined based on the extracted location information associated with the first laser base station and the extracted location information associated with the second laser base station.

20 Claims, 12 Drawing Sheets

(51) Int. Cl.
    *G01S 5/16*     (2006.01)
    *G01S 17/08*     (2006.01)
    *G01B 7/14*     (2006.01)
    *G01B 7/004*     (2006.01)
    *G01S 3/78*     (2006.01)
    *G01S 3/789*     (2006.01)
    *G01C 15/00*     (2006.01)

(52) U.S. Cl.
    CPC ............ *G01S 3/7803* (2013.01); *G01S 3/789* (2013.01); *G01S 5/16* (2013.01); *G01S 17/08* (2013.01); *G01C 15/004* (2013.01)

(58) Field of Classification Search
CPC . G01C 9/06; G01C 1/04; G01C 11/34; G01C 3/22; G01C 7/04; G01C 2009/066; G01C 21/00; G01C 21/28; G01C 1/3676; G01C 1/025; G01C 15/04; G01C 15/02; G01C 15/08; G01C 3/20; G01C 9/00; G01C 21/206; G01C 21/30; G01C 21/32; G01C 21/3635; G01C 21/3647; G01C 21/3664; G01C 21/367; G01C 21/3673; G01C 21/3676; G01C 21/3679; G01C 21/3811; G01C 21/3826; G01C 21/3848; G01C 3/085; G01C 5/06; G01C 9/24; G01C 11/00; G01C 17/00; G01C 7/02; G01C 15/004; G01C 21/3697; G01C 21/04; G01C 21/165; G01C 21/1652; G01C 21/1656; G01C 21/188; G01C 3/16; G01C 15/002; G01C 21/26; G01B 11/002; G01B 11/00; G01B 11/14; G01B 11/24; G01B 11/26; G01B 11/2518; G01B 21/22; G01B 11/25; G01B 21/042; G01B 5/0035; G01B 11/005; G01B 11/02; G01B 11/245; G01B 2210/54; G01B 5/0025; G01B 11/03; G01B 11/08; G01B 11/12; G01B 11/026; G01B 11/0608; G01B 11/2513; G01B 11/2545; G01B 11/27; G01B 21/04; G01B 21/32; G01B 2210/58; G01B 5/004; G01B 5/008; G01B 5/012; G01B 17/02; G01S 19/42; G01S 19/43; G01S 19/41; G01S 17/89; G01S 19/11; G01S 13/931; G01S 2013/9316; G01S 2013/9318; G01S 2013/9319; G01S 2013/932; G01S 2013/9322; G01S 2013/9329; G01S 17/86; G01S 2013/9315; G01S 2013/93185; G01S 13/56; G01S 2013/9321; G01S 19/14; G01S 19/12; G01S 2013/9325; G01S 17/06; G01S 19/07; G01S 19/17; G01S 19/44; G01S 19/48; G01S 19/485; G01S 19/50; G01S 19/53; G01S 2013/93271; G01S 2013/93272; G01S 2013/93273; G01S 5/021; G01S 7/487; G01S 17/10; G01S 17/42; G01S 17/87; G01S 17/88; G01S 17/93; G01S 19/071; G01S 19/074; G01S 19/47; G01S 19/52; G01S 2205/001; G01S 5/0027; G01S 7/4817; G01S 7/484; G01S 7/4863; G01S 7/4865; G01S 7/499; G01S 5/02; G01S 5/16; G01S 7/48; G01S 1/70; G01S 1/7038; G01S 13/04; G01S 13/878; G01S 13/88; G01S 15/87; G01S 15/88; G01S 19/04; G01S 19/51; G01S 5/0009; G01S 5/0081; G01S 7/417; G01S 7/4802; G01S 7/497; G01S 7/539
See application file for complete search history.

(56) References Cited

U.S. PATENT DOCUMENTS

| | | | | |
|---|---|---|---|---|
| 5,100,229 | A * | 3/1992 | Lundberg | ............ G01C 15/002 356/141.5 |
| 5,422,715 | A | 6/1995 | Clarke | |
| 7,196,302 | B2 | 3/2007 | Ohtomo et al. | |
| 10,145,671 | B2 | 12/2018 | Khatuntsev | |
| 10,371,935 | B1* | 8/2019 | Patel | ..................... G11B 7/1362 |
| 10,921,430 | B2* | 2/2021 | Ohtomo | .................. G01S 17/66 |
| 2008/0109181 | A1 | 5/2008 | Brabec | |
| 2008/0244920 | A1* | 10/2008 | Stegmaier | ............. G01S 1/7034 33/285 |
| 2012/0198711 | A1* | 8/2012 | Hayes | .................. G01C 15/006 33/227 |
| 2014/0360031 | A1* | 12/2014 | Kahlow | .................. G01C 15/06 33/295 |
| 2019/0063922 | A1 | 2/2019 | Ohtomo et al. | |
| 2021/0124026 | A1* | 4/2021 | Khatuntsev | ............... G01S 1/70 |

OTHER PUBLICATIONS

Utility U.S. Appl. No. 16/665,118, filed Oct. 28, 2019, 47 pgs.
Non-Final Office Action dated Oct. 7, 2022 in connection with U.S. Appl. No. 16/665,118, filed Oct. 28, 2019, 29 pgs.

* cited by examiner

# LASER MEASURING SYSTEM WITH MULTIPLE SYNCHRONOUS BASES

TECHNICAL FIELD

The present invention relates generally to a laser measuring system, and more particularly to a laser measuring system with multiple synchronous bases for providing full position information associated with a laser receiver.

BACKGROUND

Preparation of worksites, such as, e.g., construction and agricultural worksites, typically involves grading and excavating portions of the worksite into desired topologies. Positional measuring is an important aspect in worksite preparation in order to improve the accuracy of such grading and excavating. Laser measuring systems are commonly used by construction machines (e.g., dozers, scrapers, excavators, etc.) to facilitate positional measuring.

In one conventional approach, a laser measuring system is utilized to facilitate positional measuring. In such a conventional laser measuring system, a laser diode of a laser transmitter projects laser signals and a photo diode of a laser receiver receives the laser signals. The laser transmitter and the laser receiver are each provided with a reflective surface centered around the laser diode and the photo diode, respectively. Based on the reflections of the laser signals on the reflective surfaces, the distance between the laser transmitter and the laser receiver can be calculated. However, the reflective surface centered around the photo diode of the laser receiver in such a conventional laser measuring system requires that the size of the laser receiver be larger than would otherwise be necessary.

BRIEF SUMMARY OF THE INVENTION

In accordance with one or more embodiments, systems and methods for operating a laser receiver are provided. The laser receiver detects a first laser signal from a first laser base station. Location information associated with the first laser base station is extracted from the detected first laser signal. The laser receiver detects a second laser signal from a second laser base station. Location information associated with the second laser base station is extracted from the detected second laser signal. A position of the laser receiver is determined based on the extracted location information associated with the first laser base station and the extracted location information associated with the second laser base station.

In one embodiment, the location information associated with the first laser base station comprises a horizontal angle associated with the first laser base station, a vertical angle associated with the first laser base station, an azimuth reference angle associated with the first laser base station, and coordinates associated with the first laser base station and the location information associated with the second laser base station comprises a horizontal angle associated with the second laser base station, a vertical angle associated with the second laser base station, an azimuth reference angle associated with the second laser base station, and coordinates associated with the second laser base station. The horizontal angles associated with the first laser base station and second laser base station may be determined based on a modulation of the detected first laser signal and the detected second laser signal, respectively. The first and second laser signals may comprise a plurality of beams in an N shape, and the vertical angle associated with the first laser base station and the second laser base station may be determined based on a time of receiving each of the plurality of beams of the detected first laser signal and the detected second laser signal, respectively. The coordinates associated with the first laser base station and the second laser base station and the azimuth reference angle associated with the first laser base station and the second laser base station may be determined by demodulating a data stream in the detected first laser signal and the detected second laser signal, respectively.

In one embodiment, the first laser base station and the second laser base station are calibrated to determine the respective position of the first laser base station and the second laser base station in the reference coordinate system.

In accordance with one embodiment, systems and methods for operating a laser base station are provided. A first laser signal is detected from another laser base station. Location information associated with the other laser base station is extracted from the detected first laser signal. The location information includes coordinates and an azimuth reference angle associated with the other laser base station and a horizontal and a vertical associated with the other laser base station. A location of the laser base station is determined based on the extracted location information associated with the other laser base station. A second laser signal comprising the location of the laser base station is projected to a laser receiver for determining a position of the laser receiver.

In one embodiment, the rotation of the laser base station is synchronized with a rotation of the other laser base station based on an amplitude and a timing of the detected first laser signal. The rotation of the laser base station may be further synchronized with the rotation of the other laser base station based on the horizontal angle associated with the other laser base station.

These and other advantages of the invention will be apparent to those of ordinary skill in the art by reference to the following detailed description and the accompanying drawings.

DETAILED DESCRIPTION

Figure 1:
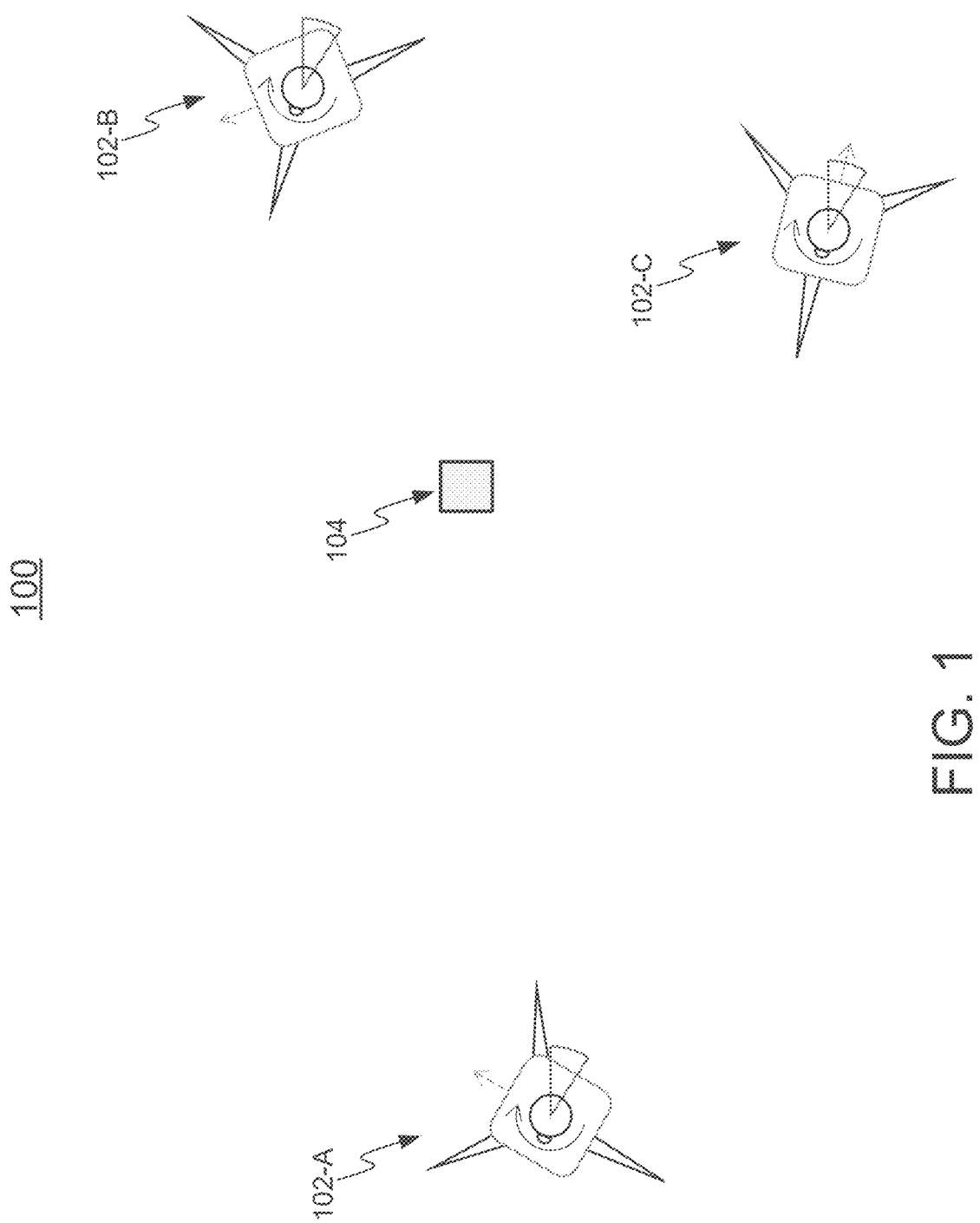
FIG. 1 shows a high-level overview of a laser measuring system.

FIG. 1 shows a high-level overview of a laser measuring system 100, in accordance with one or more embodiments.

Laser measuring system 100 may be deployed at a construction worksite, an agricultural worksite, a warehouse, or at any other environment. Laser measuring system 100 includes a plurality of laser base stations 102-A, 102-B, and 102-C (collectively referred to herein as laser base stations 102) and a laser receiver 104. While shown in FIG. 1 as laser base stations 102-A, 102-B, and 102-C and laser receiver 104, it should be understood that laser base stations 102 may include two or more laser base stations and laser receiver 104 may include any number of laser receivers (as long as the laser receivers do not create shadows or otherwise interfere with each other).

Initially, laser base stations 102 are calibrated into a reference coordinate system. During the calibration, each laser base station 102 receives location information of previously calibrated laser base stations 102, from which it determines its relative location in the reference coordinate system. For example, in some embodiments, each laser base station 102 may receive location information of two previously calibrated self-leveled laser base stations 102 or three previously calibrated non-leveled laser base stations 102. To facilitate communication between laser base stations 102 for such calibration, each laser base station 102 is configured to include both a laser transmission unit for continuously projecting laser signals in rotary irradiation and a photo detection unit for detecting laser signals as pulses due to rotation of the transmitter. In operation, the calibrated laser base stations 102 then project laser signals in rotary irradiation to laser receiver 104. Laser receiver 104 calculates (e.g., triangulates) its location (3D Cartesian coordinates) in the reference coordinate system from the laser signals received from the calibrated laser base stations 102.

Advantageously, laser receiver 104 determines its location without any transmissions to laser base stations 102. Laser receiver 104 also does not require reflective surfaces for determining its position so that a size of laser receiver 104 is not larger than necessary. Details of laser measuring system 100 are described below.

Figure 2:
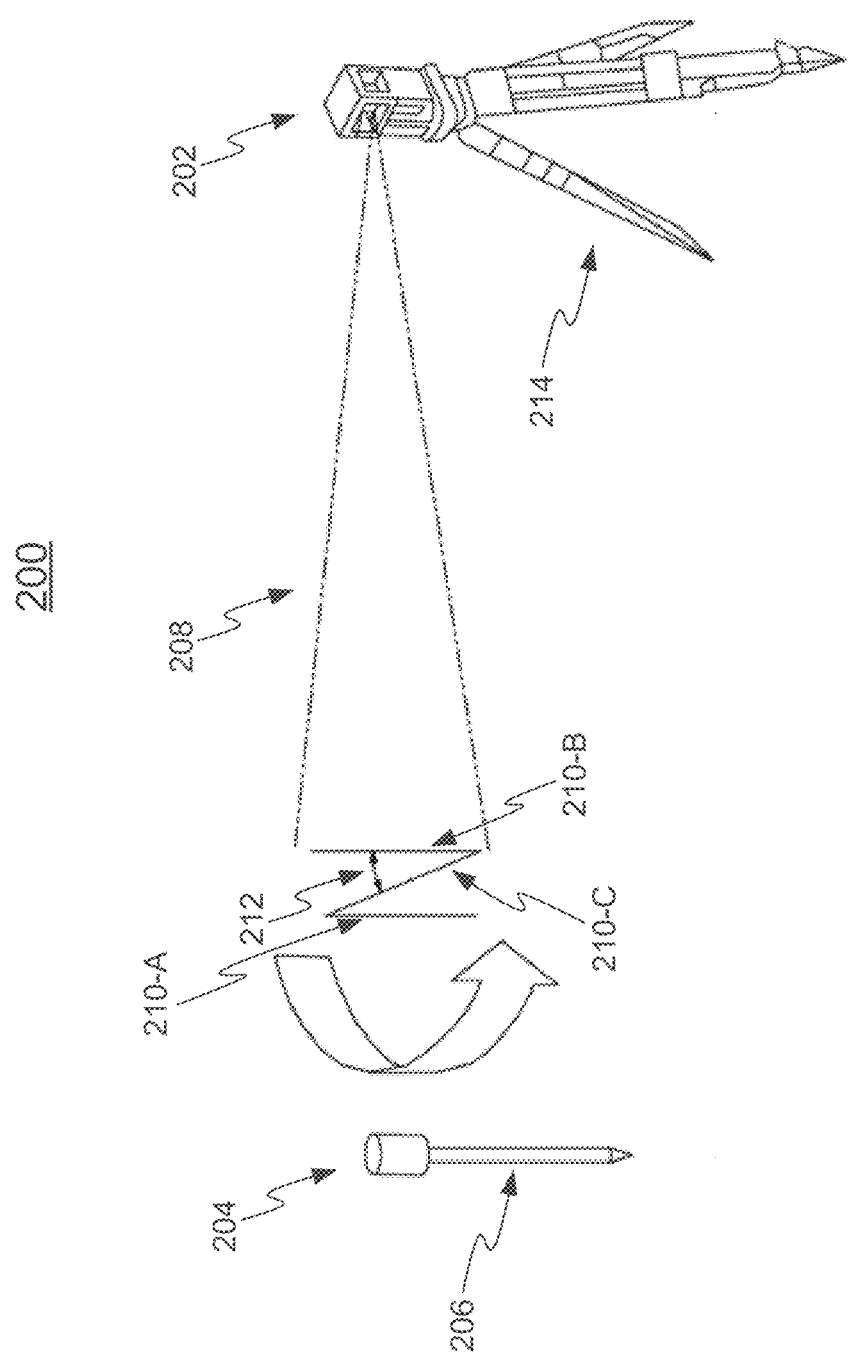
FIG. 2 shows further details of a laser measuring system.

FIG. 2 shows details of a laser measuring system 200, in accordance with one or more embodiments. In one embodiment, laser base station 202 and laser receiver 204 in FIG. 2 are laser base station 102 and laser receiver 104 in FIG. 1, respectively. While a single laser base station 202 is shown in FIG. 2 for simplicity, it should be understood that laser measuring system 200 includes a plurality of laser base stations, each operating in a similar manner as described herein with respect to laser base station 202.

As illustratively shown in FIG. 2, laser receiver 204 is configured to be mounted to a surveying pole 206. However, it should be understood that various configurations of laser receiver 204 are possible. For example, laser receiver 204 may be configured to be mounted to a rover or other vehicle such as, e.g., a construction machine (e.g., excavator, dump truck, bull dozer, etc.). In another example, laser receiver 204 is a hand held device or an embedded part of a hand held device. Similarly, laser base station 202 is mounted to a tripod 214 in FIG. 2, but may be mounted in any suitable manner.

Laser base station 202 projects (or transmits) laser signals in rotary irradiation at a constant speed. In one embodiment, laser base stations 202 project N-shaped beams 208, as described in U.S. Pat. No. 7,196,302, issued Mar. 27, 2007, the disclosure of which is incorporated herein by reference in its entirety. N-shaped beams 208 comprise a plurality of fan-shaped beams that are projected such that the cross-section of the luminous fluxes of beams 208 form an N-shape. An N-shaped beam 208 is illustratively shown in FIG. 2 as comprising vertical beam 210-A, vertical beam 210-B, and tilted beam 210-C tilted at an angle 212 with respect to vertical beams 210-A and 210-B to form an N-shape.

Laser base station 202 projects N-shaped beams 208 with modulation (e.g., phase or frequency). For example, laser base station 202 may modulate N-shaped beams 208 with a plurality of subcarriers for transmitting the horizontal angle associated with laser base station 202, as well as a data stream of additional data. The data stream may include an identifier of laser base station 202, coordinates of laser base station 202, the azimuth reference angle associated with laser base station 202, laser head calibration data of laser base station 202, horizontal and vertical angles associated with other laser base stations and their identifier, and any other relevant information.

While beams 208 projected by laser base station 202 is illustratively shown in FIG. 2 as an N-shaped beam, it should be understood that the laser signal projected by laser base station 202 may be in any suitable form. In one embodiment, laser base station 202 projects an I-shaped beam (not shown in FIG. 2) comprising a single vertical beam. In this embodiment, laser base station 202 provides 2D coordinates.

Figure 3:
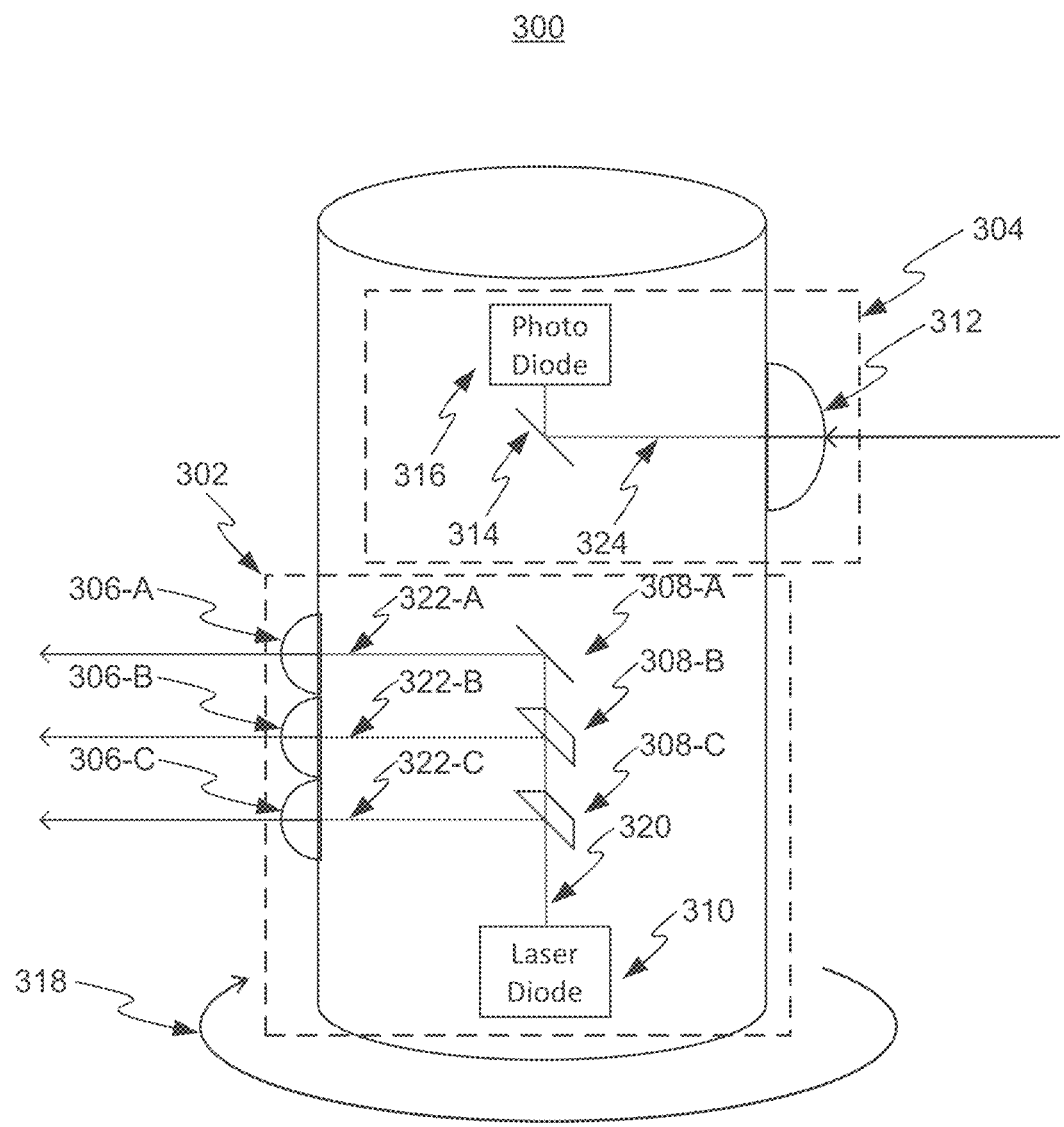
FIG. 3 shows details of a rotational head of a laser base station of a laser measuring system.

FIG. 3 shows details of a rotation head 300 of a laser base station, in accordance with one or more embodiments. In one embodiment, rotation head 300 is the rotation head of laser base station 102 in FIG. 1. Rotation head 300 includes laser transmission unit 302 for projecting laser signals and photo detection unit 304 for detecting laser signals. Rotation head 300 projects and detects laser signals respectively while rotating in a clockwise direction 318 (or in a counter-clockwise direction in some embodiments) to enable 360 degree projection and detection of laser signals around rotation head 300. It should be understood that FIG. 3 is a high-level illustration of rotation head 300, and that rotation head 300 may include additional components to facilitate projection and detection of laser signals.

Laser transmission unit 302 comprises a laser diode 310, reflectors 308-A, 308-B, and 308-C (collectively referred to herein as reflectors 308), and transmitter lenses 306-A, 306-B, and 306-C (collectively referred to herein as transmitter lenses 306). Laser diode 310 generates laser signal 320, which is reflected by reflectors 308-A, 308-B, and 308-C (reflectors 308-B and 308-C are semi-transparent reflectors and/or beam splitters) as laser signals 322-A, 322-B, and 322-C (collectively referred to herein as laser signals 322) respectively, which are projected through transmitter lenses 306-A, 306-B, and 306-C respectively, e.g., to a photo detection unit of another laser base station or laser receiver. In one embodiment, laser signals 322-A, 322-B, and 322-C form an N-shaped beam.

Laser transmission unit 302 may be in any suitable configuration as long as laser signals 322 are modulated with a common modulation signal. For example, in one embodiment, as shown in FIG. 3, laser diode 310 is embedded within rotation head 300 and rotates with rotation head 300 as rotation head 300 is rotated by a motor. In another embodiment, laser diode 310 is located at a stationary portion of the laser base station (i.e., outside of rotation head 300) such that the laser beam axis of laser diode 310 is coaxial to the rotation axis of rotation head 300. In another embodiment, laser diode 310 comprises a plurality of laser diodes (e.g., three laser diodes) embedded within rotation head 300, wherein each of the plurality of laser diodes is positioned behind a respective transmitter lens 306 such that each laser diode directly projects a respective laser signal 322 through a respective transmitter lens 306 without the need for reflectors 308 (each laser diode having a common modulation signal).

Photo detection unit 304 comprises photo diode 316, reflector 314, and receiver lens 312. A laser signal 324 is detected through receiver lens 312 (e.g., from another laser base station) and reflected by reflector 314 to photo diode 316 for analysis. The photo diode 316 may be a PIN diode, an APD (avalanche photodiode), or any other type of diode appropriate for the wavelength of laser signal 324.

Photo detection unit 304 may be in any suitable configuration. In one embodiment, as shown in FIG. 3, photo diode 316 is embedded within rotation head 300 and rotates with rotation head 300 as rotation head 300 is rotated by a motor. In another embodiment, photo diode 316 is located at a stationary portion of the laser base station (i.e., outside of rotation head 300) such that laser signal 324 is optically collimated and reflected to photo diode 316. In another embodiment, photo diode 316 is embedded within rotation head 300 and positioned behind receiver lens 312 such that photo diode 316 directly receives laser signal 324 being projected through receiver lens 312.

Figure 4:
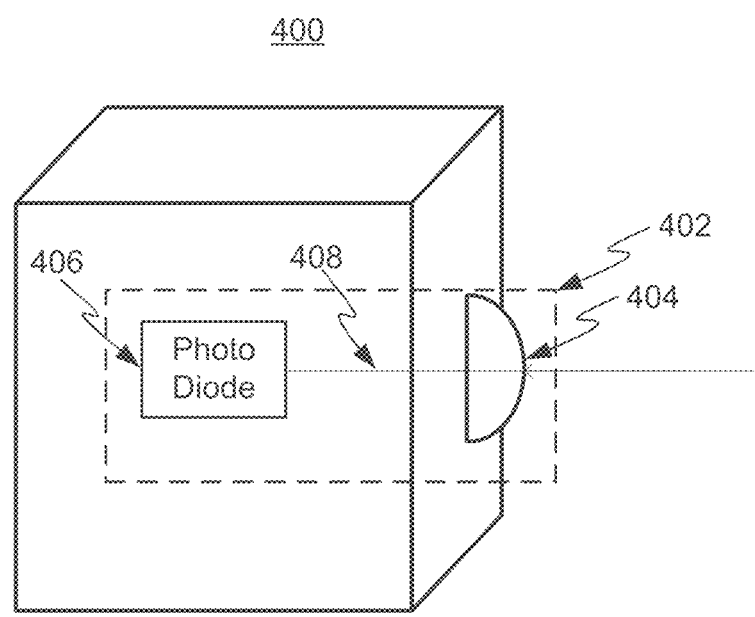
FIG. 4 shows details of a laser receiver of a laser measuring system.

FIG. 4 shows details of a laser receiver 400, in accordance with one or more embodiments. In one embodiment, laser receiver 400 is laser receiver 104 in FIG. 1. It should be understood that FIG. 4 is a high-level illustration of laser receiver 400, and that laser receiver 400 may include additional components to facilitate detection of laser signals.

Laser receiver 400 comprises photo detection unit 402. Operation of photo detection unit 402 of laser receiver 400 is similar to that of photo detection unit 304 of laser base station 300 in FIG. 3. In particular, a laser signal 408 is detected through receiver lens 404 (e.g., from a laser base station) and focused to photo diode 406 (e.g., PIN diode, P-N diode, etc.) for analysis.

In one embodiment, photo detection unit 402 is configured to enable detection of laser signal 408 from 360-degrees. For example, in one embodiment, laser receiver 400 includes one or more optical elements to enable 360-degree reception of laser signals around laser receiver 400. The one or more optical elements may include a conical mirror, a fisheye lens, a diffuse sphere, or any other method of collecting laser signals surrounding laser receiver 400. In another embodiment, laser receiver 400 comprises a plurality of photo diodes (each with a limited field of view) to cover 360-degrees surrounding laser receiver 400. It should be understood that 360-degree coverage by the photo diodes is not necessary as long as laser receiver 400 receives laser signals from a sufficient number of laser base stations (e.g., two or three).

Figure 5A:
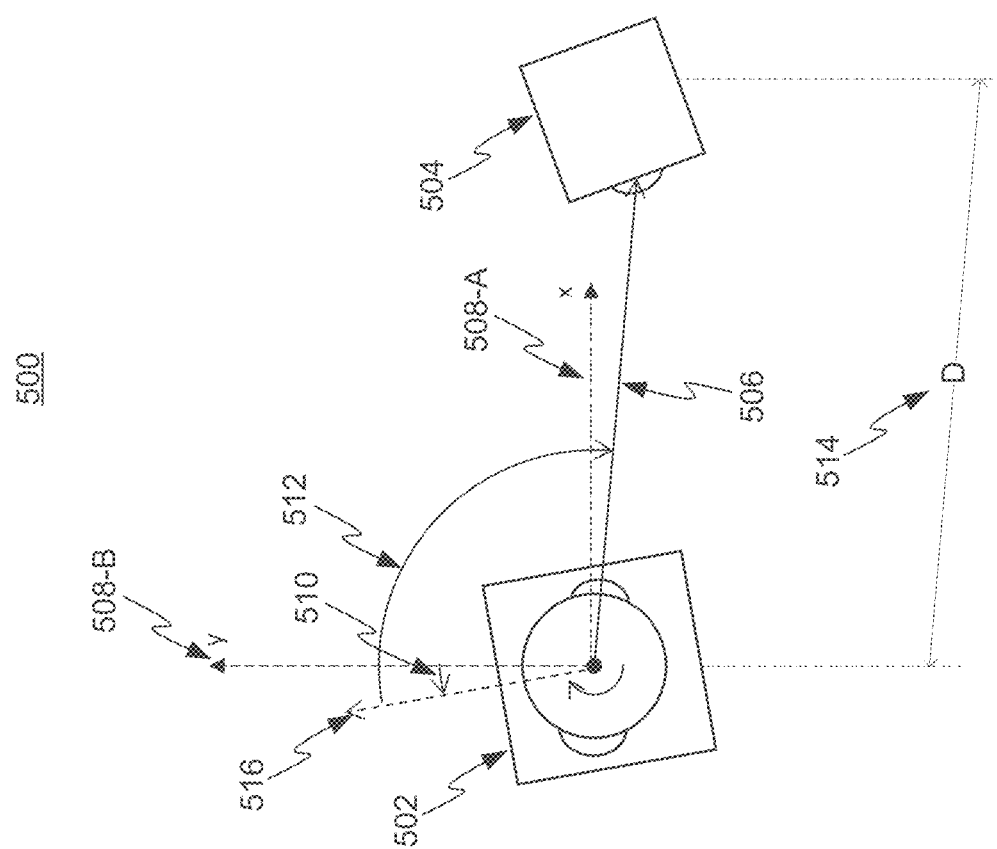
FIG. 5A shows a top view of a laser measuring system.
Figure 5B:
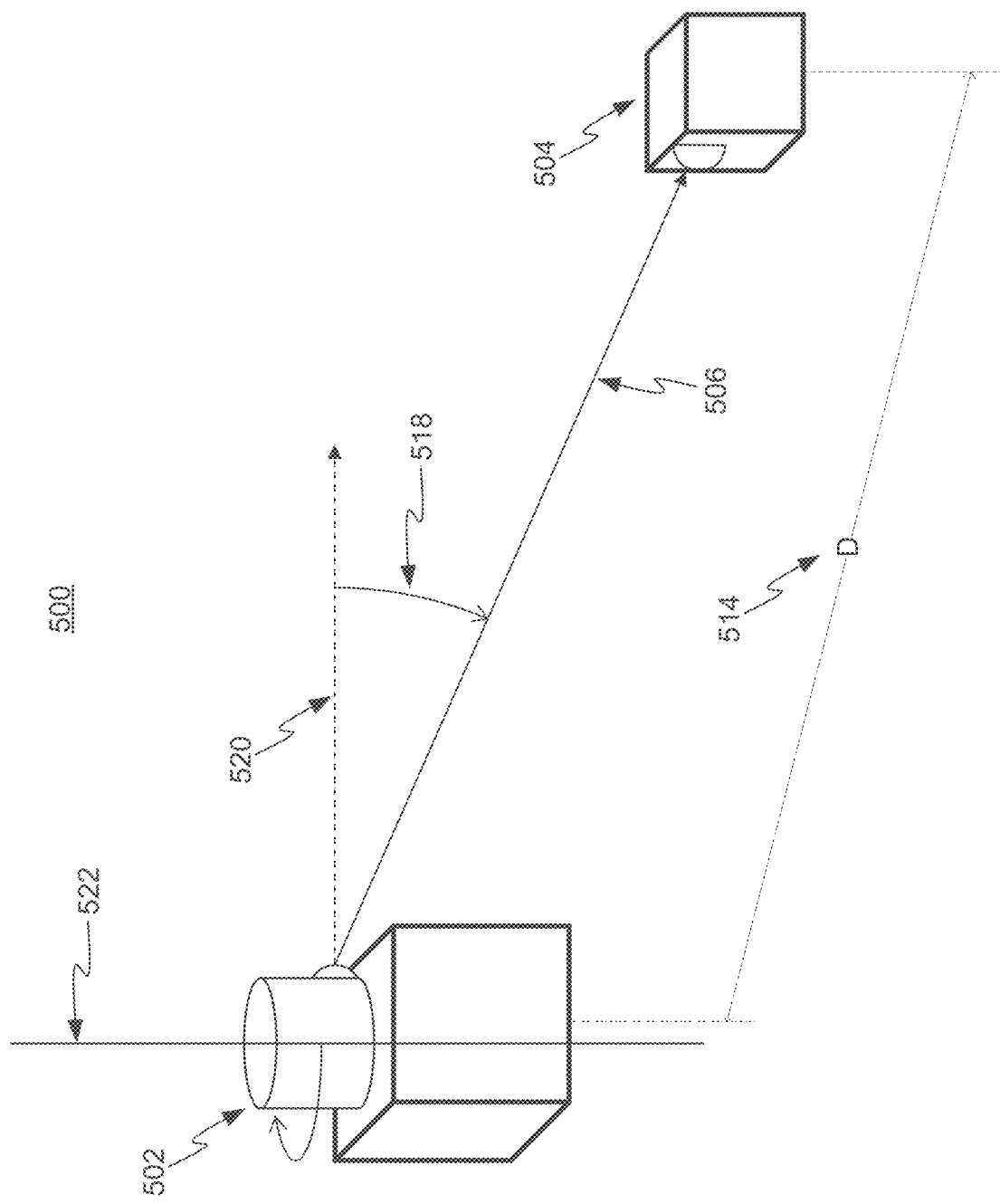
FIG. 5B shows a perspective view of a laser measuring system.

FIG. 5A is a top-down view and FIG. 5B is a perspective view showing further details of a laser measuring system 500, in accordance with one or more embodiments. In FIGS. 5A and 5B, laser base station 502 continuously projects laser signals 506 (e.g., N-shaped beam or I-shaped beam) to laser receiver 504 in rotary irradiation as laser base station 502 rotates in a clockwise direction. In one embodiment, laser base station 502 may be laser base station 102 of FIG. 1 or laser base station 202 of FIG. 2 and laser receiver 404 may be laser receiver 104 of FIG. 1 or laser receiver 204 of FIG. 2. It should be understood that FIGS. 5A and 5B show a high-level representation of laser measuring system 500 and that laser measuring system 500 may include additional components.

The position of laser receiver 504 may be defined by up to three dimensions by its Cartesian coordinates (X, Y, Z) with respect to a reference coordinate system. FIG. 5A shows X axis 508-A and Y axis 508-B of the reference coordinate system (the Z axis of the reference coordinate system is not shown in FIG. 5A but is perpendicular to both X axis 508-A and Y axis 508-B). The coordinates (X, Y, Z) may be determined based on distance D 514, horizontal angle θ 512, and/or vertical angle φ 518. Distance D 514 is the distance between laser base station 502 and laser receiver 504. Horizontal angle θ 512 is an angle at which laser receiver 504 is located relative to a reference direction 516 (e.g., the direction where the encoder of laser base station 502 reads zero for horizontal angle 512) and is measured by laser receiver 504 from laser signals 506. Vertical angle φ 518 is an angle at which laser receiver 504 is located relative to a transmitter reference level plane 520 and is calculated by laser receiver 504 based on the arrival time of each beam in the N-shaped laser signals 506.

The position of laser base station 502 may be defined by up to six dimensions: three Cartesian coordinates (X, Y, Z) with respect to the reference coordinate system and three orientation angles. The three orientation angles include an azimuth reference angle $\theta_{ref}$ 510 and two inclination angles Vx and Vy of rotation axis 522 of the rotation head of laser base station 502. Azimuth reference angle $\theta_{ref}$ 510 is an angle formed between a reference plane (e.g., the plane of the reference coordinate system formed by Y axis 508-B and the Z axis) and reference direction 516. Vx and Vy are tilt angles of rotation axis 522. It should be understood that the azimuth reference angle $\theta_{ref}$ 510 of each laser base station 502 may be different depending on the installation of that laser base station 502, however the sum of azimuth reference angle $\theta_{ref}$ 510 and horizontal angle θ 512 will be pointing to the same direction for all base stations (when bases are synchronized).

In one embodiment, laser measuring system 500 comprises at least one laser receiver 504 and at least two self-leveled laser base stations 502 projecting I-shaped laser signals 506. Laser receiver 504 in this embodiment can measure only its horizontal angle θ 512 from laser signal 506 and therefore can only determine its 2D position (without height information). Since there are at least two laser base stations 502 that are leveled and that project I-shaped laser signals 506, the position of laser base stations 502 are defined in three dimensions (2D Cartesian coordinates (X, Y) and azimuth reference angle $\theta_{ref}$ 510), which are broadcasted in digital format to laser receiver 504 via laser signal 506 with a slower rate. Knowing the 2D Cartesian coordinates (X, Y) and azimuth reference angle $\theta_{ref}$ 510 of each laser base station 502, laser receiver 504 calculates its position in 2D. Preferred coordinates for the plurality of laser base stations 502 are (0,0) and (1,0). In particular, a first laser base station 502 will be a reference point with coordinates (0,0), a second laser base station 502 will define X axis 508-A and a distance D 514 according to coordinates (1,0).

In one embodiment, laser measuring system 500 comprises at least one receiver and at least two self-leveled laser base stations 502 projecting N-shaped laser signals 506. Laser receiver 504 in this embodiment can measure its horizontal angle θ 512 and vertical angle φ 518 and therefore can determines its full 3D position. Since there are at least two laser base stations 502 that are leveled and that project N-shaped laser signals 506, the position of laser base stations 502 are defined in four dimensions (3D Cartesian coordinates (X, Y, Z) and azimuth reference angle $\theta_{ref}$ 510), which are broadcasted in digital format to laser receiver 504 via laser signal 506 with a slower rate. Knowing the 3D Cartesian coordinates (X, Y, Z) and azimuth reference angle $\theta_{ref}$ 510 of each laser base station 502, laser receiver 504 calculates its position in 3D. Preferred coordinates for first base stations are (0, 0, 0) and (1, 0, Z). Since laser base stations 502 are self-leveled, the reference coordinate system will be leveled with the horizontal Z plane. A first laser base station 502 will be a reference point with coordinates (0, 0, 0), while a second laser base station 502 will have coordinates (1, 0, Z), which will have an offset in the z direction due to the arbitrary initial position relative to reference z-plane.

In one embodiment, laser measuring system 500 comprises at least one laser receiver 504 and at least three non-leveled laser base stations 502 projecting N-shaped laser signals 506. Laser receiver 504 in this embodiment can measure its horizontal angle $\theta$ 512 and vertical angle $\varphi$ 518 and therefore can determine its full 3D position. Since there are at least three laser base stations 502 that are non-leveled and that project N-shaped laser signals 506, the position of laser base stations 502 are defined in six dimensions (3D Cartesian coordinates (X, Y, Z), azimuth reference angle $\theta_{ref}$ 510, and tilt angles Vx and Vy), which are broadcasted in digital format to laser receiver 504 via laser signal 506 with a slower rate. Knowing the 3D Cartesian coordinates (X, Y, Z), azimuth reference angle $\theta_{ref}$ 510, and tilt angles Vx and Vy of at least two laser base station 502, laser receiver 504 calculates its position in 3D. Preferred coordinates for a first laser base station 502 are (0, 0, 0), (1, 0, 0), and (x, y, 0). The first laser base station 502 will be a reference point with coordinates (0, 0, 0), the second laser base station 502 will define X axis 508-A and a distance D 514 according to coordinates (1, 0, 0), and the third laser base station 502 is used to define rotation along X axis 508-A by fixing the Z-coordinate as zero with coordinates (x, y, 0). Three center points of the at least three laser base stations 502 define a Z-plane, which in this case might be not horizontal. The inclination angles Vx and Vy for each base station will be determined by each base station based on horizontal and vertical angles of other base stations, when the Z-plane is defined.

In one embodiment, for example where the laser base station 502 is leveled, the position of laser base station 502 is defined in four dimensions: three Cartesian coordinates (X, Y, Z) and azimuth reference angle $\theta_{ref}$ 510. In another embodiment, for example where laser base station 502 is not leveled, the position of laser base station 502 is defined in six dimensions, three Cartesian coordinates (X, Y, Z), azimuth reference angle $\theta_{ref}$ 510, and inclination angles Vx and Vy. In another embodiment, for example where laser base station 502 is leveled, the position of laser base station 502 is defined in three dimensions: two Cartesian coordinates (X, Y), and azimuth reference angle $\theta_{ref}$ 510, and the position of laser receiver 504 is defined in two dimensions: two Cartesian coordinates (X, Y).

Figure 6:
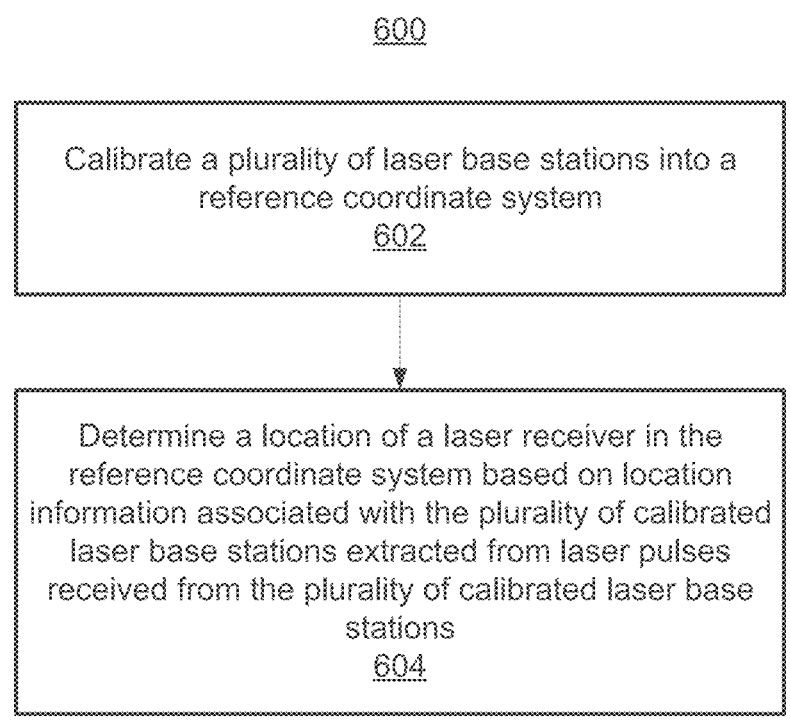
FIG. 6 shows a method of operation of a laser measuring system.

FIG. 6 shows a method 600 of operation of a laser measuring system comprising a plurality of laser base stations and a laser receiver, in accordance with one or more embodiments.

At step 602, the plurality of laser base stations (e.g., laser base stations 102 of FIG. 1) are calibrated into a reference coordinate system. The plurality of laser base stations are calibrated such that their Cartesian coordinates, tilt angles of rotation axis, and azimuth reference angles are known. In one embodiment, the plurality of laser base stations may be calibrated by iteratively performing the steps of method 700 of FIG. 7 for each respective laser base station of the plurality of laser base stations. In another embodiment, the plurality of laser base stations may be calibrated by manually defining the relative location (e.g., coordinates and azimuth reference angle) in the reference coordinate system for each laser base station.

At step 604, a location of the laser receiver (e.g., laser receiver 104 in FIG. 1) in the reference coordinate system is determined based on location information associated with the plurality of calibrated laser base stations extracted from laser signals received from the plurality of calibrated laser base stations. In one embodiment, the location information include coordinates, an azimuth reference angle, a horizontal angle, and a vertical angle associated with each of the plurality of calibrated laser base stations. The laser receiver calculates (e.g., triangulates) its relative location in the reference coordinate system based on the location information of each of the plurality of calibrated laser base stations. In one embodiment, the location of the laser receiver in the reference coordinate system is determined as described below with respect to method 800 of FIG. 8.

Figure 7:
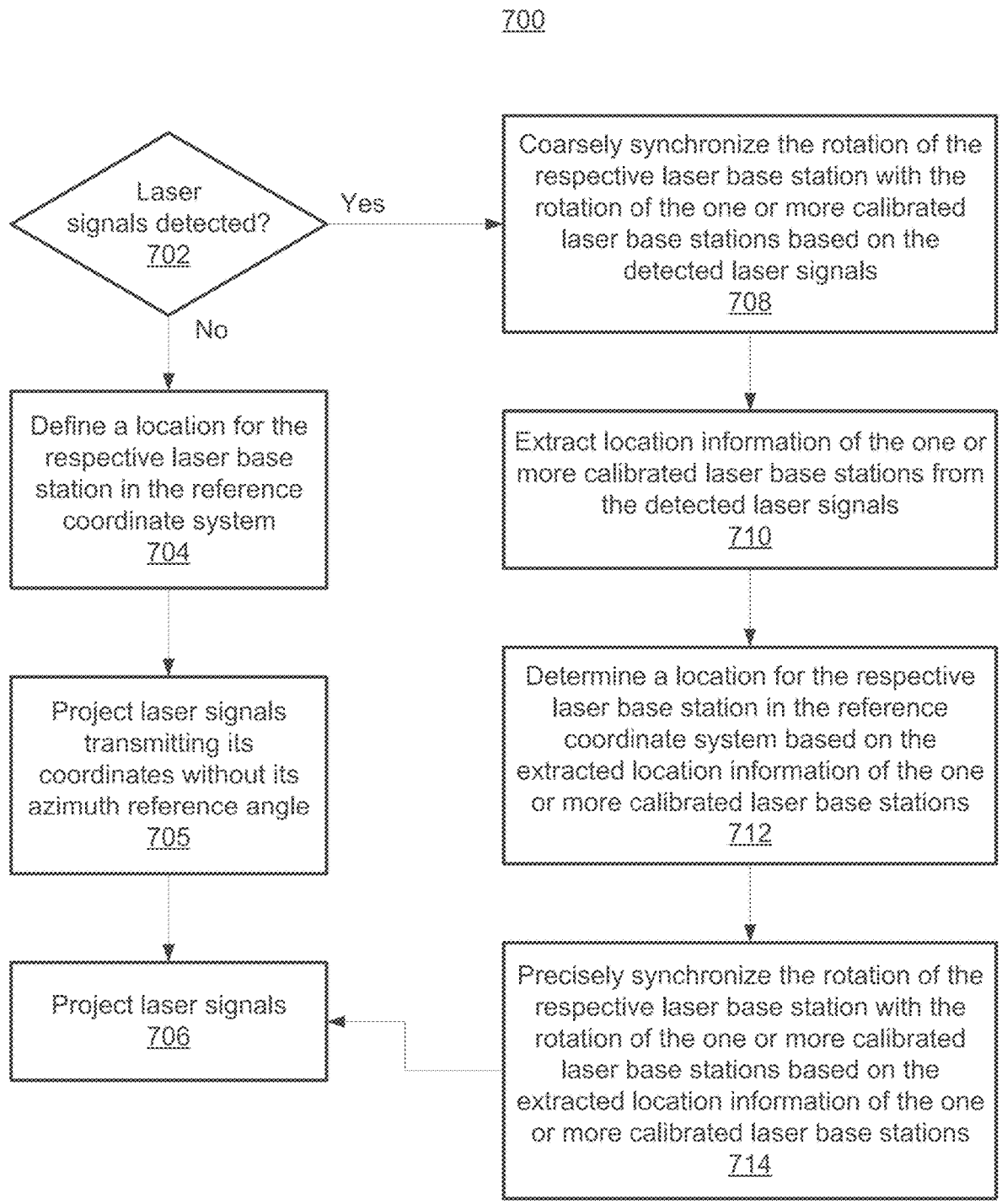
FIG. 7 shows a method for calibrating a plurality of laser base stations of a laser measuring system.

FIG. 7 shows a method 700 for calibrating a plurality of laser base stations of a laser measuring system, in accordance with one or more embodiments. In one embodiment, method 700 is performed at step 602 of FIG. 6. The steps of method 700 are iteratively repeated by each respective laser base station of the plurality of laser base stations to thereby calibrate the plurality of laser base stations into the reference coordinate system.

Method 700 starts at step 702, where it is determined whether laser signals are detected by the respective laser base station from one or more calibrated laser base stations. Step 702 may correspond to a listening mode performed by the respective laser base station upon startup of the respective base station. The laser signals detected by the respective laser base station may be projected by the calibrated laser base station at step 706 during a prior iteration of method 700 for calibrating that laser base station. During the listening mode (i.e., step 702), the respective laser base station rotates at a lower rotational speed (relative to its operational mode at step 706). In one embodiment, the rotation speed for the listening mode is within the range $$\left(\left(1 - \frac{HFOV}{360}\right) * RR; RR\right),$$

where RR is regular rotation rate during the operational mode and HFOV is the horizontal acceptance angle of the photo detection unit. In another embodiment, the rotation speed for the listening mode is within the range $$\left(0; \left(\frac{HFOV}{360} * RR\right)\right).$$

The laser signals may be detected using a photo detection unit (e.g., photo detection unit 304 of FIG. 3) of the respective laser base station. Laser signals detected at step 702 indicates that there is at least one laser base station of the plurality of laser base stations that has already been calibrated (during a prior iteration of method 700), while laser signals not detected at step 702 indicates that the respective laser base station is the first laser base station of the plurality of laser base stations to be calibrated.

If laser signals are not detected from one or more calibrated laser base stations within a predetermined period of time at step 702, method 700 proceeds to step 704 where a location for the respective laser base station in the reference coordinate system is defined as a reference location. In one embodiment, the location for the respective laser base station is defined as coordinates (0, 0, 0) and azimuth reference angle is undefined until a second laser base station becomes available to define the azimuth reference angle. Other reference locations are also contemplated. Once the location for the respective laser base station is defined at step 704, the respective laser base station proceeds to step 705, where the respective laser base station projects laser signals transmitting its coordinates (0, 0, 0) without its azimuth reference angle. During step 705, the respective laser base station is waiting to detect laser signals of another laser base station. The respective laser base station will demodulate its own horizontal angle from the data stream of the detected laser signal, which the respective laser base station uses to calculate its azimuth reference signal and complete calibration. Once calibrated, method 700 proceeds to step 706.

At step 706, the calibrated respective laser base station projects laser signals. Step 706 may correspond to an operational mode of the respective laser base station to project laser signals. During the operational mode, the calibrated respective laser base station operates at a higher rotational speed (relative to its listening mode during step 702), such as, e.g., 10 Hz, 20 Hz, etc., to continuously project laser signals in rotary irradiation, e.g., to one or more laser base stations being calibrated or to a laser receiver. For example, the calibrated respective laser base station may project laser signals, which are detected by one or more laser base stations being calibrated at step 702 during a future iteration of method 700 for calibrating that laser base station. In another example, the calibrated respective laser base station may project laser signals, which are detected by a laser receiver (of the laser measuring system) to determine its location in the reference coordinate system at step 604 of FIG. 6. The laser signals may be projected using a laser transmission unit (e.g., laser transmission unit 302 of FIG. 3) of the respective laser base station.

In one embodiment, the laser signals projected by the calibrated respective laser base station are N-shaped beams. For example, the laser signals may be N-shaped beams 208 shown in FIG. 2 comprising vertical beam 210-A, vertical beam 210-B, and beam 210-C tilted at an angle θ 212.

In one embodiment, the laser signals projected by the calibrated respective laser base station are modulated for transmitting the horizontal angle of the calibrated respective laser base station, along with a data stream of additional data. The laser signals may be modulated using any suitable modulation technique, such as, e.g., frequency modulation or phase modulation. For example, in one embodiment, the laser signals are modulated using frequency domain code divisional multiple access (CDMA) modulation. In one embodiment, the laser signals are modulated as described in U.S. Pat. No. 10,145,671, issued Dec. 4, 2018, the disclosure of which is incorporated herein by reference in its entirety.

The laser signals may be modulated using a plurality of subcarriers. In one embodiment, the laser signals are modulated using a plurality of subcarriers, as described in U.S. patent application Ser. No. 16/665,118, filed Oct. 28, 2019, the disclosure of which is incorporated herein by reference in its entirety. The plurality of subcarriers are sidebands of the carrier wave used to modulate the laser signals. The plurality of subcarriers may include any suitable number of subcarriers. One virtual channel may be modulated with a coarse and unambiguous horizontal angle of the calibrated respective laser base station (e.g., extracted with a multiple of 1×). For example, the laser signals may be modulated with a phase or frequency proportional to the horizontal angle of the calibrated respective laser base station. In one embodiment, one or more additional virtual channels may also be modulated with more precise but more ambiguous horizontal angles of the calibrated respective laser base station (e.g., extracted with a multiplication higher than 1×, such as 4×, 20×, etc.). The ambiguity may be resolved using the coarse and unambiguous horizontal angle as a reference.

The laser signals may also be modulated with a virtual channel modulated with a data stream of additional data. The data stream may include an identifier of the calibrated respective laser base station, coordinates of the calibrated respective laser base station, azimuth reference angle of the calibrated respective laser base station, laser head calibration data of the calibrated respective laser base station, horizontal and vertical angles of laser signals received from other laser base stations and their identifier, and any other relevant information.

In one embodiment, in order to demodulate the data stream from any angle around the calibrated respective laser base station, the baud rate of the modulation is set to half of the rate of rotation of the calibrated respective laser base station. This ensures that the modulated laser signals are sampled twice per symbol. Any known phase modulation technique may be employed. In one embodiment, the laser signals are also modulated with phase shift keying (PSK), such as, e.g., binary phase shift keying (BPSK), quadrature phase shift keying (QPSK), 8-PSK, 16-PSK, etc., depending on the minimum signal-to-noise ratio (SNR) desired at certain distances from the calibrated respective laser base station. In one example, using QPSK modulation will provide a data rate at the rate of rotation of the calibrated respective laser base station. For instance, 10 Hz rotation of the calibrated respective laser base station will provide a data rate of 10 bits per second (bps). Using higher levels of modulation will increase the data rate.

In one embodiment, the baud rate of the modulation set to match rotation rate of the laser base station to have a sampling rate of once per symbol. Using trellis encoding and differential phase-shift keying modulation ensures that all the receivers in the 360-degrees surrounding the laser base station will be able to demodulate the data stream.

If laser signals are detected from one or more calibrated laser base stations within a predetermined period of time at step 702, method 700 proceeds to step 708 where the rotation of the respective laser base station is coarsely synchronized with the rotation of the one or more calibrated laser base stations based on the detected laser signals. In one embodiment, the laser signal detected by the photo detection unit of the respective laser base station is used as feedback to coarsely synchronize rotation. For example, the respective laser base station may adjust its rotation in order to maximize the amplitude of the signal detected by its photo detection unit. While the laser base station is in coarse synchronization to calibrated base stations, it is able to demodulate the data stream broadcasted by the calibrated base stations.

At step 710, location information of the one or more calibrated laser base stations is extracted from the detected laser signals. The location information may include coordinates of the one or more calibrated laser base stations in the reference coordinate system and azimuth reference angles of the calibrated laser base stations. The location information may be extracted from the data stream of the detected laser signals by demodulating the detected laser signals.

At step 712, a location for the respective laser base station in the reference coordinate system is determined based on the location information of the one or more calibrated laser base stations and the vertical and horizontal angles of the one or more calibrated laser base stations. In one embodiment, the location for the respective laser base station is triangulated from the location information of two or more calibrated laser base stations (e.g., the coordinates of the one or more calibrated laser base stations and the horizontal angle of the respective laser base station on the one or more calibrated laser base stations). If there is only one calibrated base station at this moment, then respective base station becomes the second base station with coordinates (1,0,0) or (1,0,Z) defining the distance unit and the azimuth reference angle. The triangulation calculation does not provide the distance between laser base stations. Instead, a relative scale distance will be used. In one embodiment, the relative scale distance between the first two calibrated laser base stations is defined as 1.0 and the relative scale distances between all other laser base stations are defined relative to this. The triangulation calculation is performed by the respective laser base station in a similar manner as described below for the laser receiver.

At step 714, the rotation of the respective laser base station is precisely synchronized with the rotation of the one or more calibrated laser base stations based on the extracted location information of the one or more calibrated laser base stations. The respective base station starts to project the laser signal with broadcasting information only about its position without the azimuth reference angle. All other calibrated base stations will receive horizontal and vertical angles from the respective base station and will broadcast those angles back in digital format via one or more virtual channels. When the respective base station demodulates the information of its vertical and horizontal angles (from the calibrated base stations), it will calculate its azimuth reference angle and synchronize rotation precisely. The synchronization of the rotation of the respective laser base station with the rotation of the one or more calibrated laser base stations enables time domain signal separation for the detection of laser signals (e.g., by the plurality of laser base stations or by the laser receiver). The laser base stations are precisely synchronized when their instant azimuth angles ($\theta-\theta_{ref}$) are the same at any given moment, where $\theta$ is the horizontal angle and $\theta_{ref}$ is the azimuth reference angle.

Once a location of the respective laser base station in the reference coordinate system is determined (step 712) and the rotation of the respective laser base station is precisely synchronized (step 714), the respective laser base station is calibrated. Method 700 then proceeds to step 706 where the calibrated respective laser base station projects laser signals broadcasting its position and its azimuth reference angle in the operational mode.

In one embodiment, one or more (e.g., all) of the plurality of laser base stations may be relocated to a new location (e.g., field, worksite, etc.) without losing the integrity of the laser measuring system. Once the plurality of laser base stations have been calibrated, any of the plurality of laser base stations may be relocated one at a time to a new location. The relocation is possible when there are at least two base stations that stays stationary at a time. Once relocated, the relocated laser base station may perform the steps of method 700 to determine its new location within the original reference coordinate system.

Figure 8:
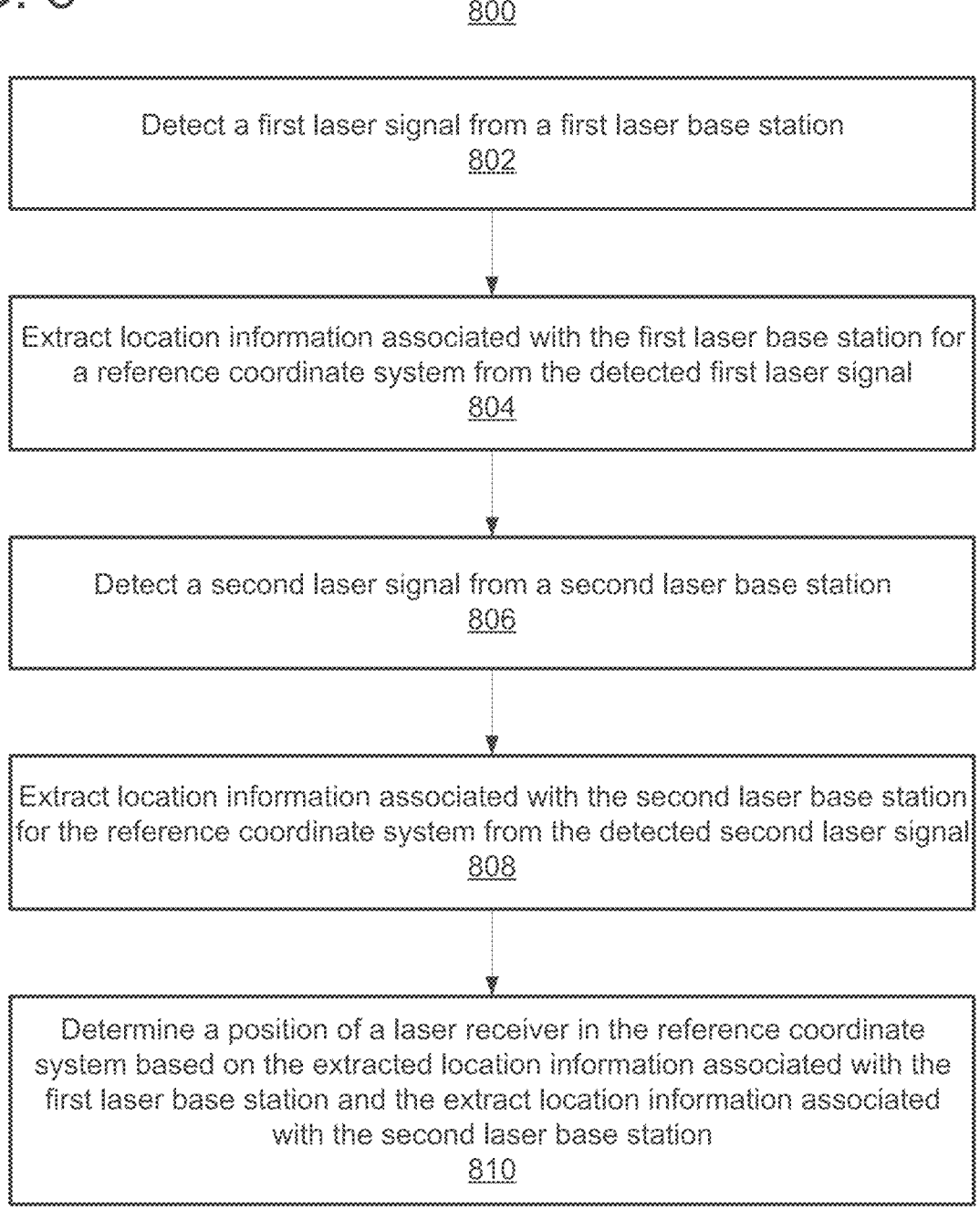
FIG. 8 shows a method for determining a location of a laser receiver of a laser measuring system.

FIG. 8 shows a method 800 for determining a location of a laser receiver in a laser measuring system based on laser signals received from a plurality of laser base stations in the laser measuring system, in accordance with one or more embodiments. In one embodiment, method 800 is performed at step 604 of FIG. 6. The steps of method 800 may be performed by the laser receiver (e.g., laser receiver 104 of FIG. 1). In one embodiment, the plurality of laser base stations comprise a first laser base station and a second laser base station that were previously calibrated, e.g., according to method 700 of FIG. 7. It should be understood that the plurality of laser base stations may comprise two or more laser base stations, and method 800 is not limited to a first and second laser base station.

At step 802, a first laser signal is detected from the first laser base station. The first laser signal may be modulated (e.g., phase or frequency) with the horizontal angle associated with the first laser base station and a data stream. The data stream may include an identifier of the first laser base station, coordinates of the first laser base station, the azimuth reference angle of the first laser base station, laser head calibration data of the first laser base station, horizontal and vertical angles of laser signals received from other laser base stations and their identifier, and any other relevant information. In one embodiment, the first laser signal comprises a plurality of beams in an N shape (e.g., N-shaped beams 208 of FIG. 2).

At step 804, location information associated with the first laser base station for a reference coordinate system is extracted from the detected first laser signal. The location information associated with the first laser base station may include a horizontal angle associated with the first laser base station, a vertical angle associated with the first laser base station, an azimuth reference angle associated with the first laser base station, and coordinates associated with the first laser base station. In one embodiment, the location information associated with the first laser base station may be determined as described in U.S. patent application Ser. No. 16/665,118, filed Oct. 28, 2019, the disclosure of which is incorporated herein by reference in its entirety.

In one embodiment, the vertical angle $\varphi$ associated with the first laser base station is determined based on a time of receiving each of the plurality of beams of the N-shaped first laser signal. For example, the vertical angle $\varphi$ may be calculated according to Equation 1 as follows:

$$\varphi = k(a\tan(t_{12}/t_{23}) - \pi/4) \quad \text{(Equation 1)}$$

where k is a coefficient that describes the physical alignment of the plurality of beams in the N shape (e.g., the angle of the middle tilted beam (e.g., angle 212 of beam 210-C in FIG. 2)), $t_{12}$ is the time difference between detecting a first beam and the middle tilted beam (e.g., beams 210-A and 210-C respectively) of the plurality of beams in the N shape, and $t_{23}$ is the time difference between detecting a middle tilted beam and the third beam (e.g., beams 210-C and 210-B respectively) of the plurality of beams in the N shape.

In one embodiment, the horizontal angle $\theta$ associated with the first laser base station is determined based on a modulation of the first laser signal. For example, the first laser base station may modulate the laser signal using four subcarriers. The modulated signal (TxSignal) is represented in Equation 2 as follows, where A in the instant head rotation angle of the transmitter of the first laser base station (from its encoder), C is the carrier phase, S is the subcarrier phase, and P1, P2, P3, and P4 are phases of the modulated subcarrier signals.

$$TxSignal = \sin(P1) + \sin(P2) + \sin(P3) + \sin(P4) \quad \text{(Equation 2)}$$

where $P1 = C + 3S + \frac{A}{4} + A$, $P2 = C + S - \frac{A}{4} - 3A$, $P3 = C - S - \frac{A}{4} + 3A$, and $P4 = C - 3S + \frac{A}{4} - A$.

The horizontal angle θ may be calculated according to Equation 3 as follows:

$$\theta = P1 - P2 - P3 + P4 \quad \text{(Equation 3)}$$

In one embodiment, the coordinates (e.g., 3D Cartesian coordinates) associated with the first laser base station are determined by demodulating the first laser signal. In particular, the first laser signal may be demodulated to extract the data stream, which includes the coordinates associated with the first laser base station.

At step 806, a second laser signal from the second laser base station is detected. The second laser signal may be modulated (e.g., phase or frequency) with the horizontal angle associated with the second laser base station and a data stream. The data stream may include an identifier of the second laser base station, coordinates of the second laser base station, the azimuth reference angle of the second laser base station, laser head calibration data of the second laser base station, horizontal and vertical angles of laser signals received from other laser base stations and their identifier, and any other relevant information. In one embodiment, the second laser signal comprises a plurality of beams in an N shape (e.g., N-shaped beams 208 of FIG. 2).

At step 808, location information associated with the second laser base station for a reference coordinate system is extracted from the detected second laser signal. The location information associated with the second laser base station may include a horizontal angle associated with the second laser base station, a vertical angle associated with the second laser base station, and coordinates associated with the second laser base station. The location information may be extracted from the received second laser signal as described above with respect to the location information associated with the first laser base station at step 804.

At step 810, a position of a laser receiver in the reference coordinate system is determined based on the demodulated location information associated with the first laser base station, measured horizontal and vertical angles from the first laser base station, the demodulated location information associated with the second laser base station, and the measured horizontal and vertical angles from the second laser base station. The position (coordinates) of the laser receiver can be calculated from two laser base systems using Equation 4.

$$\vec{R}_{est} = \frac{1}{2}\left(\vec{R}_a + \vec{R}_b\right) \quad \text{(Equation 4)}$$

where $\vec{R}_a$ and $\vec{R}_b$ are receiver projection points along the direction lines from each laser base station such that $\vec{R}_a = \vec{A} + D_a * \vec{n}_a$ and $\vec{R}_b = \vec{B} + D_b * \vec{n}_b$. $\vec{A}$ and $\vec{B}$ are coordinates of laser base station A and B respectively, $D_a$ and $D_b$ are distances from laser base stations to projection points, and $\vec{n}_a$ and $\vec{n}_b$ are normal or directions to the laser receiver from laser base stations A and B.

$$D_a = \frac{b*c + a}{1 - c*c} \text{ and } D_b = \frac{a*c + b}{1 - c*c},$$

where a, b, and c are auxiliary scalars: $a = \vec{n}_a * (\vec{B} - \vec{A})$, $b = \vec{n}_b * (\vec{A} - \vec{B})$, and $c = \vec{n}_a * \vec{n}_b$, where $\vec{n}_a = \{\sin \varphi_a \cos(\theta_a \times \theta_{Aref})$; $\sin \varphi_a \sin(\theta_a - \theta_{Aref})$; $\cos \varphi_a\}$ and $\vec{n}_b = \{\sin \varphi_b \cos(\theta_b - \theta_{Bref})$; $\sin \varphi_b \sin(\theta_b - \theta_{Bref})$; $\cos \varphi_b\}$, $\theta_a$ and $\theta_b$ are horizontal angles measured from multiple subcarriers, and $\varphi_a$ and $\varphi_b$ are vertical angles calculated from ratio of time differences between signals of N-beam. Laser base station coordinates $\vec{A}$ and $\vec{B}$ and base station azimuth reference angles $\theta_{Aref}$ and $\theta_{Bref}$ are demodulated from broadcasted data stream from both laser base stations.

For the systems with more than two base stations, the position of the laser receiver can be averaged from positions of all pair combinations, or best fit gradient search can be used to find the resulting position.

Figure 9:
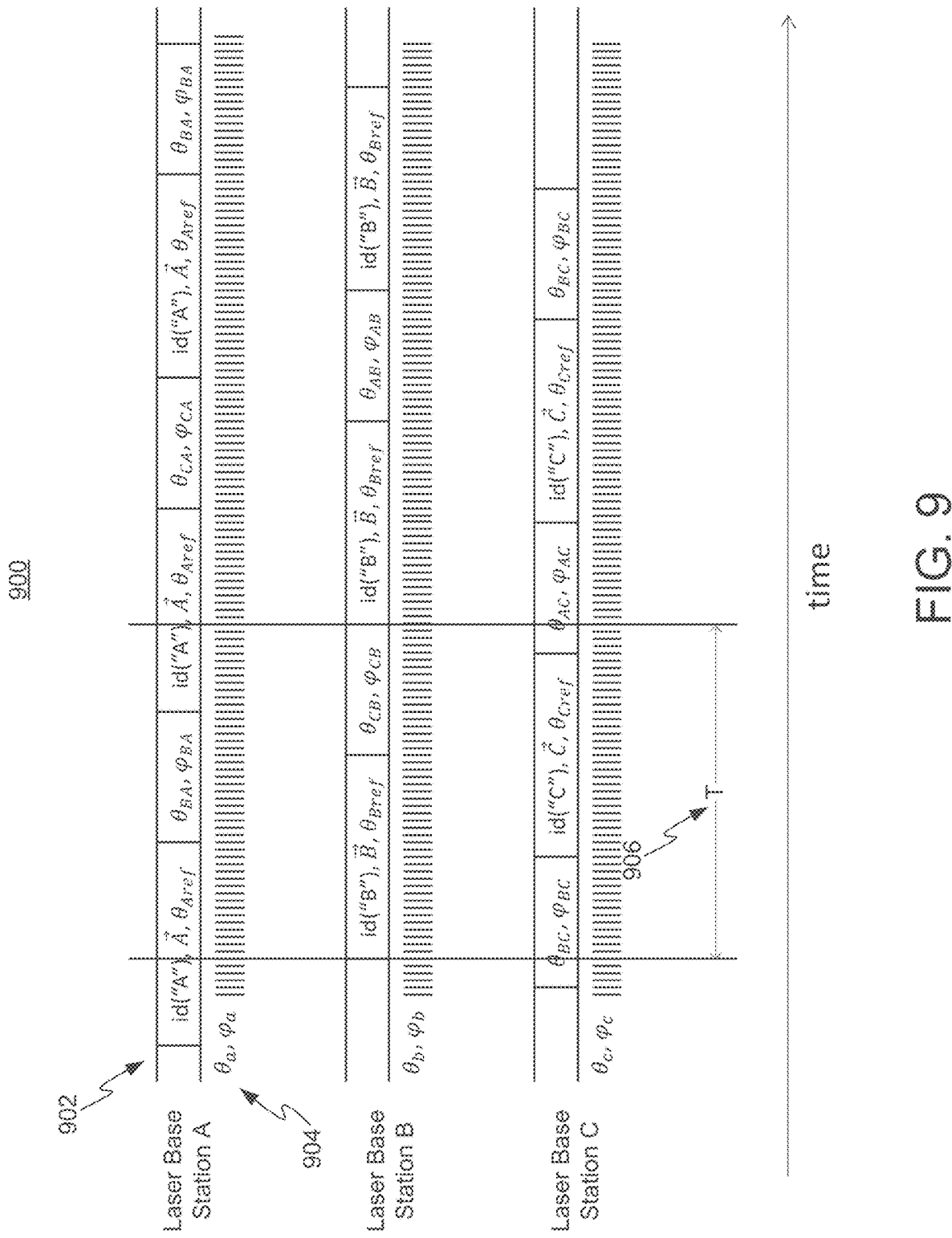
FIG. 9 shows a timing diagram of signals received by a laser receiver.

FIG. 9 shows a timing diagram 900 of signal received from laser base stations A, B, and C by a laser receiver, in accordance with one or more embodiments. Timing diagram 900 will be described with reference to FIG. 1, where laser base station A corresponds to laser base station 102-A, laser base station B corresponds to laser base station 102-B, laser base station C corresponds to laser base station 102-C, and the laser receiver corresponds to laser receiver 104.

As shown in timing diagram 900, the laser receiver receives laser signals from all laser base stations. Due to synchronous rotation of the base station transmitters, the laser receiver receives signals as pulses separated in time domain. The laser receiver measures its horizontal angle $\theta_A$ and vertical angle $\varphi_A$ (with respect to laser base station A) directly from laser signal 904 and receives a data stream 902 demodulated from laser signal 904. Data stream 902 comprises an identifier id("A") of laser base station A, coordinates $\vec{A}$ of laser base station A, an azimuth reference angle $\theta_{Aref}$ associated with laser base station A, horizontal angles $\alpha_{BA}$ and $\varphi_{CA}$ of laser base station B (with respect to laser base station A) and of laser base station C (with respect to laser base station A) respectively, and vertical angles $\varphi_{BA}$ and $\varphi_{CA}$ of laser base station B (with respect to laser base station A) and of laser base station C (with respect to laser base station A) respectively. Data measured and demodulated from the laser signals from laser base station B and laser base station C is similar to the data measured and demodulated from laser signals from laser base station A discussed above. Time period T 906 is the laser receiver initialization time representing the for the laser receiver to collect coordinates and azimuth reference angles of all laser base stations A, B, and C.

Figure 10:
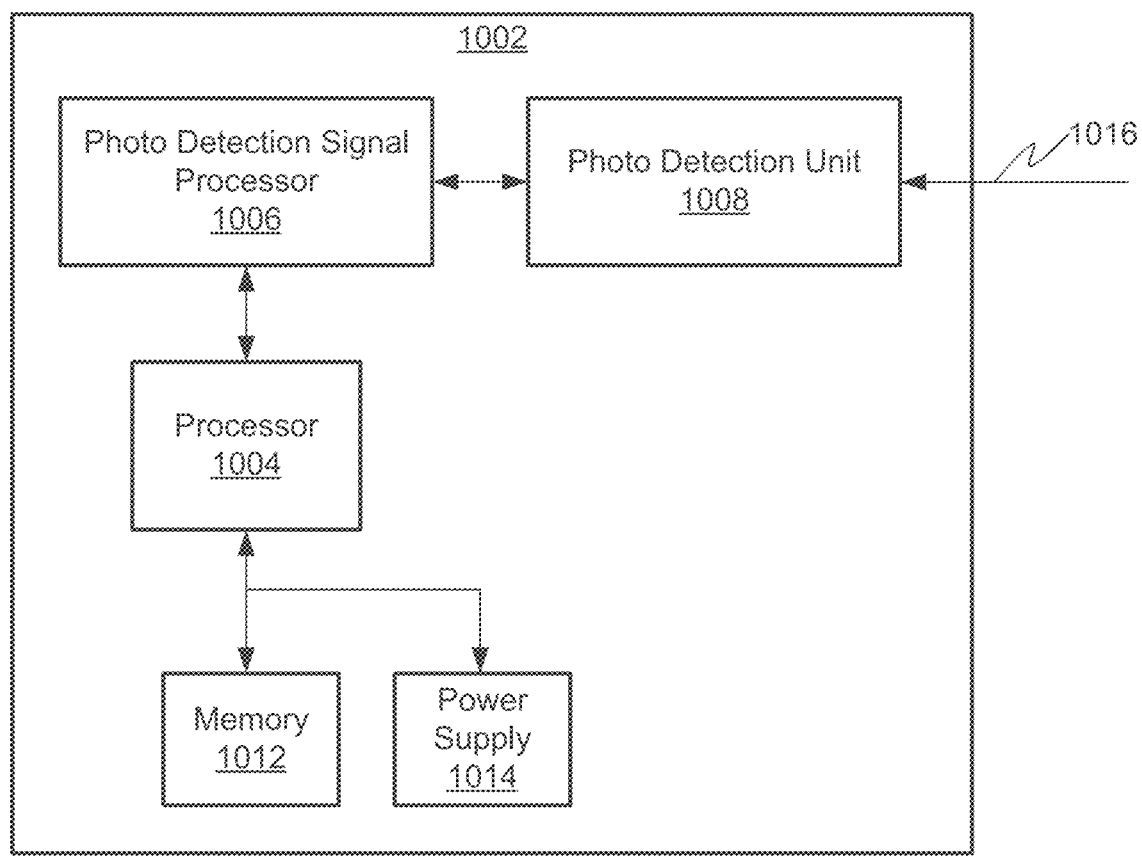
FIG. 10 shows a high-level block diagram of an exemplary laser receiver.

FIG. 10 shows a high level block diagram of a laser receiver 1002, in accordance with one or more embodiments. In one embodiment, laser receiver 1002 may be laser receiver 104 of FIG. 1. It should be understood that FIG. 10 is a high level representation of laser receiver 1002 to generally show functional computing components of laser receiver 1002 for illustrative purposes, and that laser receiver 1002 may be implemented with additional structural or functional components.

Laser receiver 1002 includes photo detection unit 1008 for detecting and receiving one or more laser signals 1016 (e.g., N-shaped beams 208 in FIG. 2). In one embodiment, photo detection unit 1008 may be photo detection unit 402 in FIG. 4. Photo detection unit 1008 may include, e.g., one or more photo detectors, photodiodes, or any other suitable device. Upon receiving laser signals 1016, a photo detection signal is provided as input to photo detection signal processor 1006, where it is determined whether or not light has been received by laser receiver 1002. As will be appreciated, any required signal processing such as, e.g., analog-to-digital conversion, may be performed in a well-known manner, and any modulated data superimposed on laser signals 1016 is extracted and analyzed by photo detection signal processor 1006 in conjunction with processor 1004. Power supply 1014 supplies power to laser receiver 1002 in a well-known fashion. Power supply 1014 may be, for example, a rechargeable battery (e.g., NiMH) or an alkaline battery, or may be powered by an exterior power source, such as, e.g., a construction machine associated with laser receiver 1002. Memory 1012 stores computer program instructions (e.g., code) that when executed by processor 1004 carries out operations, such as, e.g., the steps of method 800 of FIG. 8. One skilled in the art will recognize that an implementation of laser receiver 1002 may have other structures and components (e.g., transimpedance amplifier, band pass filter, demodulator, analog-to-digital converter), and that FIG. 10 is a high level representation of some of the components of such a laser receiver for illustrative purposes.

Figure 11:
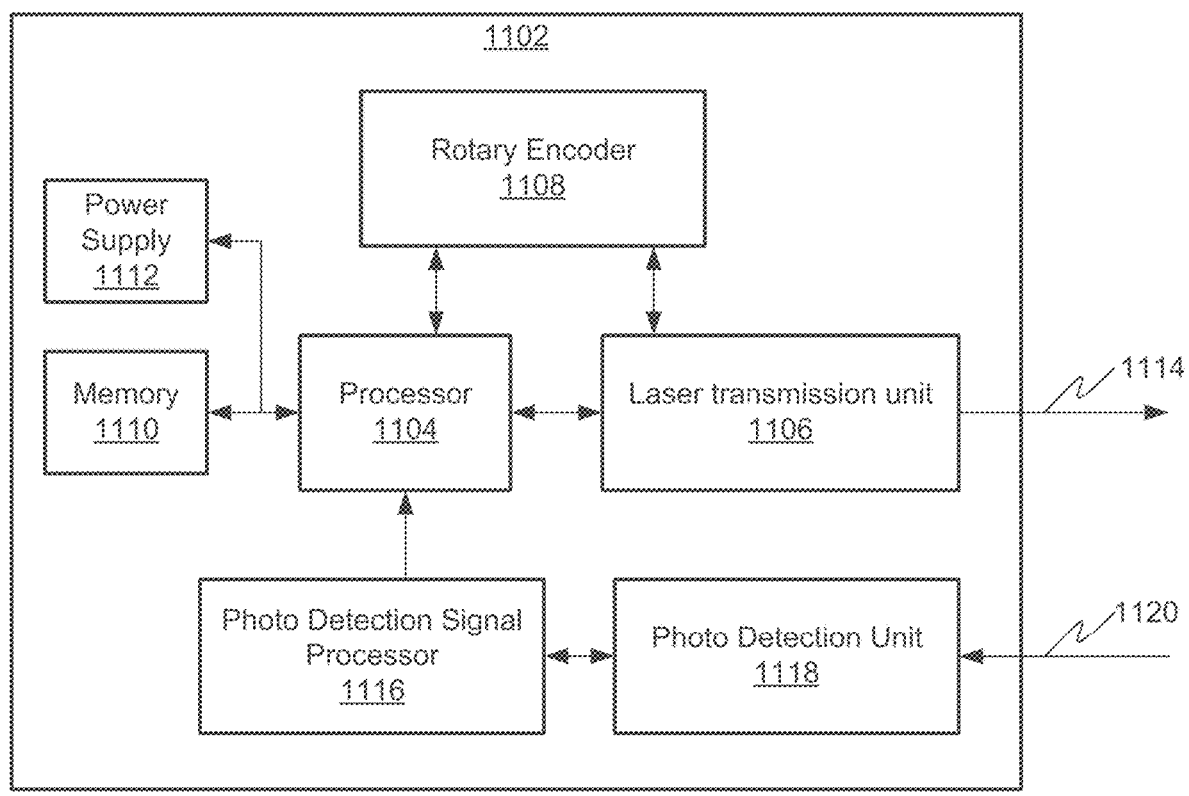
FIG. 11 shows a high-level block diagram of an exemplary laser transmitter.

FIG. 11 shows a high level block diagram of a laser base station 1102, in accordance with one or more embodiments. In one embodiment, laser base station 1102 may be laser base station 102 of FIG. 1. It should be understood that FIG. 11 is a high level representation of laser base station 1102 to generally show functional computing components of laser base station 1102 for illustrative purposes, and that laser base station 1102 may be implemented with additional structural or functional components.

Laser base station 1102 includes laser transmission unit 1106 for projecting one or more laser signals 1114 in rotary irradiation (e.g., N-shaped beams 208 in FIG. 2 of I-shaped beams). In one embodiment, laser transmission unit 1106 may be laser transmission unit 302 in FIG. 3. Laser base station 1102 may modulate data on laser signals 1114. Rotary encoder 1108 measures the instant (horizontal) angle of the head of laser base station 1102. Laser base station 1102 also includes photo detection unit 1118 for detecting and receiving one or more laser signals 1120 (e.g., N-shaped beams 208 in FIG. 2). In one embodiment, photo detection unit 1118 may be photo detection unit 304 in FIG. 3. Upon receiving laser signals 1120, a photo detection signal is provided as input to photo detection signal processor 1116, where it is determined whether or not light has been received by laser receiver 1102.

Power supply 1112 supplies power to laser base station 1102 in a well-known fashion. Power supply 1112 may be, for example, a rechargeable battery (e.g., NiMH) or an alkaline battery, or may be powered by an exterior power source, such as, e.g., a construction machine associated with laser base station 1102. Memory 1110 stores computer program instructions (e.g., code) that when executed by processor 1104 carries out operations, such as, e.g., the steps of method 700 of FIG. 7. One skilled in the art will recognize that an implementation of laser base station 1102 may have other structures and may contain other components as well, and that FIG. 11 is a high level representation of some of the components of such a laser base station for illustrative purposes.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 6-8. Certain steps or functions of the methods and workflows described herein, including one or more of the steps or functions of FIGS. 6-8, may be performed by a server or by another processor in a network-based cloud-computing system. Certain steps or functions of the methods and workflows described herein, including one or more of the steps of FIGS. 6-8, may be performed by a client computer in a network-based cloud computing system. The steps or functions of the methods and workflows described herein, including one or more of the steps of FIGS. 6-8, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 6-8, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

One skilled in the art will recognize that an implementation of laser receiver 1002 of FIG. 10 and laser base station 1102 of FIG. 11 may have other structures and may contain other components as well, and that FIGS. 10 and 11 are a high level representation of some of the components of such a laser receiver and laser base station for illustrative purposes. For example, laser receiver 1002 and laser base station 1102 may also include one or more network interfaces for communicating with other devices via a network and one or more input/output devices that enable user interaction with other computers or systems (e.g., display, keyboard, mouse, speakers, buttons, etc.). Such input/output devices may include peripherals, such as a printer, scanner, display screen, etc. For example, input/output devices may include a display device such as a cathode ray tube (CRT) or liquid crystal display (LCD) monitor for displaying information to the user, a keyboard, and a pointing device such as a mouse or a trackball by which the user can provide input.

Processors 1004 and 1104 may include both general and special purpose microprocessors, and may be the sole processor or one of multiple processors. Processors 1004 and 1104 may include one or more central processing units (CPUs), for example. Processors 1004 and 1104 and/or memories 1012 and 1110 may include, be supplemented by, or incorporated in, one or more application-specific integrated circuits (ASICs) and/or one or more field programmable gate arrays (FPGAs).

Memories 1012 and 1110 each include a tangible non-transitory computer readable storage medium, and may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of operation of a laser receiver, comprising:
    detecting a first laser signal from a first laser base station;
    extracting location information associated with the first laser base station from the detected first laser signal;
    detecting a second laser signal from a second laser base station;
    extracting location information associated with the second laser base station from the detected second laser signal; and
    determining a position of the laser receiver based on the extracted location information associated with the first laser base station and the extracted location information associated with the second laser base station.

2. The method of claim 1, wherein:
    the location information associated with the first laser base station comprises a horizontal angle associated with the first laser base station, a vertical angle associated with the first laser base station, an azimuth reference angle associated with the first laser base station, and coordinates associated with the first laser base station; and
    the location information associated with the second laser base station comprises a horizontal angle associated with the second laser base station, a vertical angle associated with the second laser base station, an azimuth reference angle associated with the second laser base station, and coordinates associated with the second laser base station.

3. The method of claim 1, wherein:
    extracting location information associated with the first laser base station from the detected first laser signal comprises determining a horizontal angle associated with the first laser base station based on a modulation of the detected first laser signal; and
    extracting location information associated with the second laser base station from the detected second laser signal comprises determining a horizontal angle associated with the second laser base station based on a modulation of the detected second laser signal.

4. The method of claim 1, wherein:
    the detected first laser signal comprises a plurality of beams in an N shape and extracting location information associated with the first laser base station from the detected first laser signal comprises determining a vertical angle associated with the first laser base station based on a time of receiving each of the plurality of beams of the detected first laser signal; and
    the detected second laser signal comprises a plurality of beams in an N shape and extracting location information associated with the second laser base station from the detected second laser signal comprises determining a vertical angle associated with the second laser base station based on a time of receiving each of the plurality of beams of the detected second laser signal.

5. The method of claim 1, wherein:
    extracting location information associated with the first laser base station from the detected first laser signal comprises demodulating the detected first laser signal to determine coordinates and an azimuth reference angle associated with the first laser base station; and
    extracting location information associated with the second laser base station from the detected second laser signal comprises demodulating the detected second laser signal to determine coordinates and an azimuth reference angle associated with the second laser base station.

6. The method of claim 1, wherein the first laser base station and the second laser base station are calibrated to determine a respective position of the first laser base station and the second laser base station.

7. A laser receiver, comprising:
    a photo detection unit for detecting a first laser signal from a first laser base station and a second laser signal from a second laser base station;
    a processor; and a memory to store computer program instructions, the computer program instructions when executed on the processor cause the processor to perform operations comprising:

extracting location information associated with the first laser base station from the detected first laser signal;

extracting location information associated with the second laser base station from the detected second laser signal; and determining a position of the laser receiver based on the extracted location information associated with the first laser base station and the extracted location information associated with the second laser base station.

8. The laser receiver of claim 7, wherein:

the location information associated with the first laser base station comprises a horizontal angle associated with the first laser base station, a vertical angle associated with the first laser base station, an azimuth reference angle associated with the first laser base station, and coordinates associated with the first laser base station; and the location information associated with the second laser base station comprises a horizontal angle associated with the second laser base station, a vertical angle associated with the second laser base station, an azimuth reference angle associated with the second laser base station, and coordinates associated with the second laser base station.

9. The laser receiver of claim 7, wherein:

extracting location information associated with the first laser base station from the detected first laser signal comprises determining a horizontal angle associated with the first laser base station based on a modulation of the detected first laser signal; and extracting location information associated with the second laser base station from the detected second laser signal comprises determining a horizontal angle associated with the second laser base station based on a modulation of the detected second laser signal.

10. The laser receiver of claim 7, wherein:

the detected first laser signal comprises a plurality of beams in an N shape and extracting location information associated with the first laser base station from the detected first laser signal comprises determining a vertical angle associated with the first laser base station based on a time of receiving each of the plurality of beams of the detected first laser signal; and the detected second laser signal comprises a plurality of beams in an N shape and extracting location information associated with the second laser base station from the detected second laser signal comprises determining a vertical angle associated with the second laser base station based on a time of receiving each of the plurality of beams of the detected second laser signal.

11. The laser receiver of claim 7, wherein:

extracting location information associated with the first laser base station from the detected first laser signal comprises demodulating the detected first laser signal to determine coordinates and an azimuth reference angle associated with the first laser base station; and extracting location information associated with the second laser base station from the detected second laser signal comprises demodulating the detected second laser signal to determine coordinates and an azimuth reference angle associated with the second laser base station.

12. The laser receiver of claim 7, wherein the first laser base station and the second laser base station are calibrated to determine a respective position of the first laser base station and the second laser base station in the reference coordinate system.

13. A method of operation of a laser base station, comprising:

detecting a first laser signal from another laser base station;

extracting location information associated with the other laser base station from the detected first laser signal, the location information comprising coordinates and an azimuth reference angle associated with the other laser base station and a horizontal and a vertical angle associated with the other laser base station;

determining a location of the laser base station based on the extracted location information associated with the other laser base station; and projecting a second laser signal comprising the location of the laser base station to a laser receiver for determining a location of the laser receiver.

14. The method of claim 13, further comprising:

synchronizing a rotation of the laser base station with a rotation of the other laser base station based on an amplitude and a timing of the detected first laser signal.

15. The method of claim 13, further comprising synchronizing a rotation of the laser base station with the rotation of the other laser base station based on the horizontal angle associated with the other laser base station.

16. A laser base station, comprising:

a photo detection unit for detecting a first laser signal from another laser base station;

a processor;

a memory to store computer program instructions, the computer program instructions when executed on the processor cause the processor to perform operations comprising:

extracting location information associated with the other laser base station from the detected first laser signal, the location information comprising coordinates and an azimuth reference angle associated with the other laser base station and a horizontal and a vertical angle associated with the other laser base station, and determining a location of the laser base station based on the extracted location information associated with the other laser base station; and a laser transmission unit for projecting a second laser signal comprising the location of the laser base station to a laser receiver for determining a location of the laser receiver.

17. The laser base station of claim 16, the operations further comprising:

synchronizing a rotation of the laser base station with a rotation of the other laser base station based on an amplitude and a timing of the detected first laser signal.

18. The laser base station of claim 16, the operations further comprising synchronizing a rotation of the laser base station with the rotation of the other laser base station based on the horizontal angle associated with the other laser base station.

19. A laser measuring system, comprising:

a first laser base station for projecting a first laser signal;

a second laser base station for projecting a second laser signal; and a laser receiver comprising:
  a photo detection unit for detecting the first laser signal and the second laser signal;
  a processor; and
  a memory to store computer program instructions, the computer program instructions when executed on the processor cause the processor to perform operations comprising:
    extracting location information associated with the first laser base station from the detected first laser signal;
    extracting location information associated with the second laser base station from the detected second laser signal; and
    determining a position of the laser receiver based on the extracted location information associated with the first laser base station and the extracted location information associated with the second laser base station.

20. The laser measuring system of claim 19, wherein:
the location information associated with the first laser base station comprises a horizontal angle associated with the first laser base station, a vertical angle associated with the first laser base station, an azimuth reference angle associated with the first laser base station, and coordinates associated with the first laser base station; and
the location information associated with the second laser base station comprises a horizontal angle associated with the second laser base station, a vertical angle associated with the second laser base station, an azimuth reference angle associated with the second laser base station, and coordinates associated with the second laser base station.

\* \* \* \* \*